Oct. 31, 1967 R. T. CORNELIUS 3,349,940
THERMALLY INSULATED TANK
Filed Dec. 28, 1964

INVENTOR.
RICHARD T. CORNELIUS
BY
Hill, Sherman, Meroni, Gross & Simpson
ATTYS.

United States Patent Office 3,349,940
Patented Oct. 31, 1967

3,349,940
THERMALLY INSULATED TANK
Richard T. Cornelius, Minneapolis, Minn., assignor to The Cornelius Company, Anoka, Minn., a corporation of Minnesota
Filed Dec. 28, 1964, Ser. No. 421,423
8 Claims. (Cl. 220—9)

ABSTRACT OF THE DISCLOSURE

A cylindrical tank has separate elastomeric bases fixed to its ends, and a radially spaced tubular member of foil-lined paper encircling the tank and supported at opposite ends by portions of said bases which are larger in diameter than the tubular member and which taper into the tubular member.

This invention relates generally to tanks for handling beverages in the bulk, and more specifically to a tank assembly or structure by which a precooled beverage tank resists heat absorption during subsequent unrefrigerated handling.

Although the principles of the present invention may be included in various tanks, a particularly useful application is made in a tank of the type that is constructed to be filled with beer or other carbonated beverages, particularly for use at home, picnics, and the like. In the non-commercial market, there frequently is unrefrigerated handling and dispensing of beer or other beverage from a precooled bulk supply of the same, and such non-commercial handling typically renders the beverage subject to a temperature rise which is undesirable.

The present invention contemplates the utilization of a tank which is equipped with structure by which heat is reflected, and structure by which heat is poorly conducted. Stated otherwise, the tank structure is insulated in a novel inexpensive manner to render it resistant to heat absorption.

Accordingly, it is an object of the present invention to provide a thermally insulated tank.

Another object of the present invention is to provide a beverage tank which is particularly resistant, when precooled, to a temperature rise by heat absorption from the ambient atmosphere.

A further object of the present invention is to provide a thermally insulated tank which is so constructed as to be shock resistant.

A still further object of the present invention is to provide a thermally insulated tank of generally cylindrical configuration which may be rolled on its side without damage to the thermal insulation.

Yet another object of the present invention is to provide a tank of the type described which may be stacked temporarily or for dispensing on either end.

Many other advantages, features and additional objects of the present invention will become manifest to those versed in the art upon making reference to the detailed description and to the accompanying sheet of drawings in which a preferred structural embodiment incorporating the principles of the present invention is shown by way of illustrative example.

Figure 1:
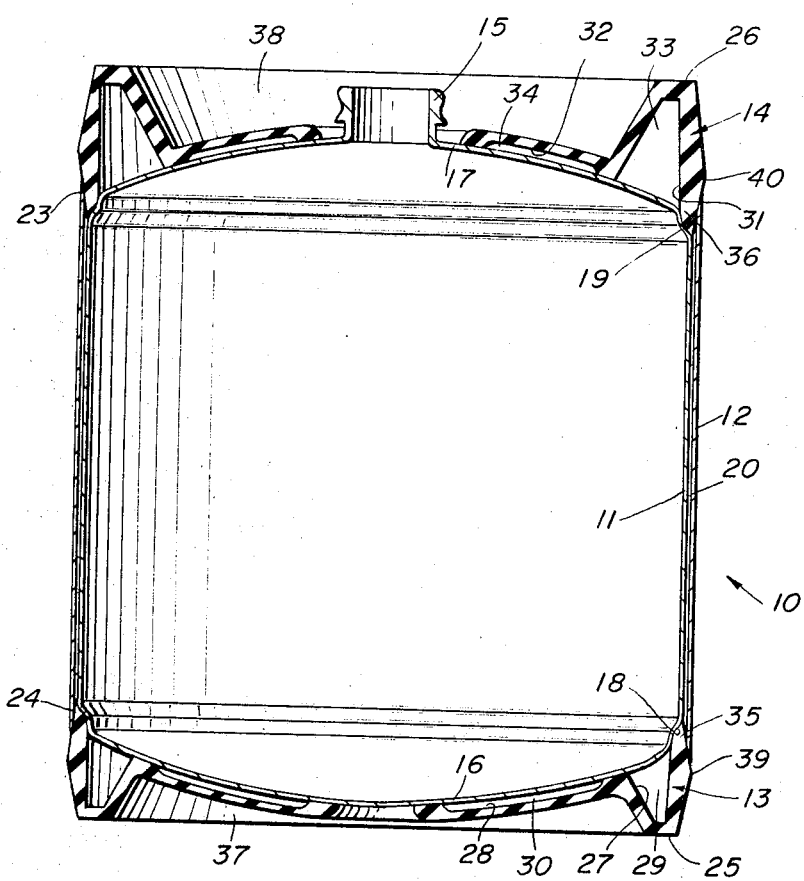
Figure 2:
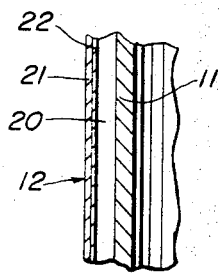

On the drawings:

FIG. 1 is a cross-sectional view of a thermally insulated tank provided in accordance with the principles of the present invention; and FIG. 2 is a fragmentary enlarged view of a portion of FIG. 1.

As shown on the drawings:

The principles of this invention are particularly useful when embodied in a thermally insulated tank or tank assembly such as illustrated in FIG. 1, generally indicated by the numeral 10. The thermally insulated tank or tank assembly 10 includes a cylindrical tank or liner 11 surrounded by a tubular member 12 which is supported at its ends by a pair of bases or support members 13, 14.

The tank 11 preferably comprises stainless steel and is provided suitable fittings, the instant embodiment including a fitting 15 so shaped as to be sealable by means of a conventional crown cap. The tank 11 has a lower end 16 and an upper end 17, such ends 16, 17 respectively having an axially directed annular shoulder 18, 19.

The tubular member 12 comprises thermally insulative material, and is spaced from the tank 11 to define therewith an annular air-space 20. The thermally insulative material of the tubular member 12 preferably comprises a stiff paper base 21 having a foil layer 22 lining the same and fixedly secured thereto. The foil 22 may comprise aluminum and is illustrated in exaggerated thickness in FIG. 2 for clarity. The paper base may comprise cardboard, corrugated board, or the like. The tubular member 12 has an upper end 23 which is supported by the base 14, and a lower end 24 which is supported by the lower base 13.

The base 13 also comprises thermally insulative material, the same comprising an elastomer, such as resilient rubber in this embodiment which is fairly firm. The base 13 has a flat peripheral annular support surface 25 by which the insulated tank 10 may be supported for rest on a floor of a cabinet, building, etc. The base 14 has a similar flat peripheral annular support surface 26 so that the insulated tank 10 may be supported in an inverted position, either for storage or for dispensing with the fitting 15 directed downwardly. The base 13 has means which defines a pair of concentric annular grooves 27, 28 which open to the lower end 16 of the tank and which therewith define a pair of annular air-spaces 29, 30 which are completely closed to the atmosphere as the base 13 is joined sealably to the lower end 16 of the tank 11. Similarly, the base 14 has means defining a pair of annular grooves 31, 32 which define with the upper tank end 17, a pair of dead air-spaces 33, 34. If needed for support, the annular air-spaces may be subdivided to comprise various dead air pockets.

The upper end of the base 13 includes an annular portion 35 which is seated against and joined to the downwardly directed shoulder 18, while the upper base 14 has a similar annular portion 36 which is seated against and joined to the upwardly directed shoulder 19. The portions 35, 36 are externally tapered and also extend into the lower and upper ends 24, 23 respectively of the tubular member 12. By this structure, the tubular member 12 is precluded from moving axially and is maintained in a concentric spaced relation with the tank 11.

The base 13 further defines a downwardly directed recess 37 which is closed by the floor on which the insulated tank rests to thereby define a further dead air-space. Similarly, the upper base 14 has means which defines a similar recess 38 for defining a dead air-space when the assembly is supported on the annular surface 26. The axially directed recesses 37, 38 are thus adjacent to the grooves 27 and 28, and 31 and 32 respectively.

The base 13 has a maximum outside diameter indicated at 39, while the base 14 has a maximum outside diameter indicated at 40. The outside diameters 39 and 40 are greater than any outside diameter of the tank 11 or of the tubular member 12. These outside diameters on the bases 13 and 14 enable the insulated tank 10 to be supported on its side and rolled, and as the diameters are greater than others of the structure, the tubular member 12 is afforded some degree of mechanical protection. Similarly, tanks may be stacked against each other laterally and similar protection is afforded to the tubular member 12.

The bases 13 and 14 preferably comprise heat-insulative material as mentioned above and as they preferably comprise a shock resistant elastomer, such as rubber, the entire device is protected against damage due to various contacts during handling.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A tank assembly comprising:
   (a) a cylindrical tank;
   (b) a pair of bases of heat-insulative material respectively fixedly secured to opposite ends of said tank for supporting said tank, each of said bases having a pair of concentric internal annular grooves opening toward the end of said tank and defining a pair of annular air-spaces therewith at each end of said tank in which air is permanently trapped; and
   (c) a tubular member of heat-insulative material exposed to the atmosphere and encircling said tank in spaced relation thereto, and supported at its opposite ends by said bases.

2. A tank assembly comprising:
   (a) a cylindrical metal tank;
   (b) a pair of separate bases of elastomeric material respectively fixedly secured directly to opposite ends of said tank for directly supporting said tank; and
   (c) a tubular member of heat-insulative material exposed to the atmosphere and encircling said tank in spaced relation thereto, and supported at its opposite ends by said bases.

3. A tank assembly comprising:
   (a) a cylindrical metal tank having oppositely directed shoulders at its opposite ends;
   (b) a pair of separate bases of heat-insulative material respectively fixedly secured directly to said shoulders of said tank for directly supporting said tank, at least one of said bases being annular, encircling a tank opening, and covering substantially the entire end of the tank except such opening, said one of said bases having means defining closed air-space pockets in which air is permanently trapped between said one of said bases and the adjacent end of the tank; and
   (c) a tubular member of heat insulative material exposed to the atmosphere and encircling said tank in spaced relation thereto, and supported at its opposite ends by said bases.

4. A tank assembly comprising:
   (a) a cylindrical tank;
   (b) a tubular member of foil-lined paper exposed to the atmosphere and encircling said tank in spaced relation thereto along its entire length; and
   (c) a pair of molded support members respectively fixedly secured to opposite ends of said tank for supporting said tank and also supporting said tubular member at its opposite ends and maintaining said spaced relation.

5. A tank assembly comprising:
   (a) a cylindrical tank;
   (b) a tubular member of heat-insulative material exposed to the atmosphere and encircling said tank in spaced relation thereto along its entire length; and
   (c) a pair of molded circular support members respectively fixedly secured to opposite ends of said tank for supporting said tank, said members respectively having portions integral therewith and extending into opposite ends of said tubular member and supporting the same and maintaining said spaced relation.

6. A tank assembly comprising:
   (a) a cylindrical tank;
   (b) a tubular member of heat-insulative material exposed to the atmosphere and encircling said tank in spaced relation thereto along its entire length; and
   (c) a pair of molded circular support members respectively fixedly secured to opposite ends of said tank for supporting said tank, said members respectively having portions integral therewith extending into opposite ends of said tubular member and supporting the same and maintaining said spaced relation, said support members each having an outside diameter integral therewith which is greater than any outside diameter on said tank or on said tubular member.

7. A tank assembly comprising:
   (a) a cylindrical tank having a pair of axially directed annular shoulders respectively disposed at the outer ends thereof;
   (b) a tubular member of foil-lined paper encircling said tank in spaced relation thereto; and
   (c) a pair of annular support bases of resilient heat-insulative material, said bases respectively having portions extending into opposite ends of said tubular member and supporting the same in said spaced relation, said portions being secured to and seated against said pair of shoulders, at least one of said bases having at least one internal annular groove opening toward the end of said tank and defining an annular air-space therewith, and said support members each having an outside diameter greater than any outside diameter on said tank or on said tubular member.

8. A tank assembly comprising in combination:
   (a) a cylindrical tank;
   (b) a pair of separate bases of heat-insulative material respectively fixedly secured to opposite ends of said tank, said bases having annular portions extending along the side of said tank; and
   (c) a tubular member of heat-insulative material encircling said tank in radially spaced relation thereto, opposite ends of said tubular member receiving said annular portions and being respectively supported by said annular portions and maintained by said annular portions in said spaced relation to said tank;
   (d) said annular portions tapering from an external diameter larger than said tubular member to a smaller diameter within said tubular member.

References Cited

UNITED STATES PATENTS

| | | | |
|---|---|---|---|
| 964,080 | 7/1910 | Wolf. | |
| 1,147,227 | 7/1915 | Ford | 220—11 |
| 2,043,183 | 6/1936 | Mauser. | |
| 2,103,677 | 12/1937 | Kline et al. | |
| 2,124,565 | 7/1938 | Goll et al. | |
| 2,927,543 | 3/1960 | Sherbondy | 229—3.5 |
| 2,997,197 | 8/1961 | Ficker et al. | 220—67 |

THERON E. CONDON, *Primary Examiner.*

RAPHAEL H. SCHWARTZ, *Examiner.*